US008149860B2

(12) United States Patent
Kim et al.

(10) Patent No.: US 8,149,860 B2
(45) Date of Patent: Apr. 3, 2012

(54) CABLE BROADCAST RECEIVING APPARATUS AND COMPOSING METHOD OF CHANNEL MAP THEREOF

(75) Inventors: Dong-Won Kim, Suwon-si (KR); Young-Joo Seo, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1028 days.

(21) Appl. No.: 11/503,927

(22) Filed: Aug. 15, 2006

(65) Prior Publication Data

US 2007/0064734 A1 Mar. 22, 2007

(30) Foreign Application Priority Data

Sep. 5, 2005 (KR) .................. 10-2005-0082234

(51) Int. Cl.
 *H04J 3/16* (2006.01)
(52) U.S. Cl. .......................................... 370/437
(58) Field of Classification Search .......... 370/431, 370/437, 463, 464; 348/571, 714, 716; 725/146, 725/80, 37–61, 105, 118, 120, 134–135, 725/138–139, 142–145, 25–29, 30, 131–132, 725/133, 140, 141, 151–153
See application file for complete search history.

(56) References Cited

U.S. PATENT DOCUMENTS

| 5,784,095 A * | 7/1998 | Robbins et al. ............... 725/49 |
| 7,383,562 B2 | 6/2008 | Cho et al. |
| 2002/0059638 A1* | 5/2002 | Oz et al. .......................... 725/129 |
| 2002/0116706 A1* | 8/2002 | Bahraini ........................... 725/32 |
| 2005/0015799 A1 | 1/2005 | Park |
| 2005/0085183 A1* | 4/2005 | Lee .............................. 455/3.01 |
| 2005/0188410 A1 | 8/2005 | Kahn et al. |
| 2006/0026651 A1* | 2/2006 | Kwon et al. ..................... 725/80 |
| 2006/0026666 A1* | 2/2006 | Cha et al. ....................... 725/146 |
| 2006/0176909 A1* | 8/2006 | Strasser ........................ 370/474 |
| 2006/0279659 A1* | 12/2006 | Yun et al. ...................... 348/571 |

FOREIGN PATENT DOCUMENTS

CN  1658660 A  8/2005

(Continued)

OTHER PUBLICATIONS

Extended European Search Report mailed Aug. 5, 2011 relative to counterpart European Patent Application.

(Continued)

*Primary Examiner* — Derrick Ferris
*Assistant Examiner* — Omar Ghowrwal
(74) *Attorney, Agent, or Firm* — Roylance, Abrams, Berdo & Goodman, L.L.P.

(57) ABSTRACT

A cable broadcast receiving apparatus and composing method thereof are provided where a cable broadcast receiver receives a cable broadcast signal, a Point-of-Deployment ("POD") cable card processes out-of-band data received from the cable broadcast receiver, an in-band ("INB") processor processes in-band data received from the cable broadcast receiver, and a controller composes a channel map by comparing channel information included in the out-of-band ("OOB") data with channel information included in the in-band data. Accordingly, the cable broadcast receiving apparatus and the controlling method thereof are capable of composing a correct channel map based on OOB data as well as INB data. Additionally, time can be saved in composing the channel map by reducing the channel search using OOB data within a certain time.

16 Claims, 4 Drawing Sheets

FOREIGN PATENT DOCUMENTS

| | | |
|---|---|---|
| KR | 2004-0056481 A | 7/2004 |
| KR | 2004-0083707 | 10/2004 |
| KR | 2005-0009861 | 1/2005 |
| WO | WO2004-100536 A1 | 11/2004 |

OTHER PUBLICATIONS

Korean Office Action mailed Nov. 13, 2006 relative to counterpart Korean Patent Application.

Korean Office Action mailed Mar. 21, 2007 relative to counterpart Korean Patent Application.

Korean Notice of Allowance mailed May 9, 2007 relative to counterpart Korean Patent Application.

Chinese Office Action mailed Nov. 28, 2008 relative to counterpart Chinese Patent Application.

* cited by examiner

CABLE BROADCAST RECEIVING APPARATUS AND COMPOSING METHOD OF CHANNEL MAP THEREOF

PRIORITY

This application claims the benefit under 35 U.S.C. §119(a) of Korean Patent Application No. 2005-0082234, filed Sep. 5, 2005, in the Korean Intellectual Property Office, the entire disclosure of which is hereby incorporated by reference.

BACKGROUND OF THE INVENTION

1. Field of the Invention

The present invention relates to a cable broadcast receiving apparatus and a composing method of a channel map thereof. More particularly, the present invention relates to a cable broadcast receiving apparatus in which a channel map is composed by using a Point-of-Deployment (POD) cable card in an open cable broadcast system, and a composing method of a channel map thereof.

2. Description of the Related Art

In general, a cable broadcast receiving apparatus in an open cable broadcasting system is divided into a host and a POD module. The host refers to a set-top box that receives and processes a cable broadcast signal, or a Digital Cable Ready (DCR) TV that features a combined set-top box and TV. The POD module refers to a processing module that receives encoded contents from a head-end and decodes it. The POD module which is manufactured in a type of Personal Computer Memory Card International Association (PCMCIA) card is connected to a set-top box or a DCR TV for use.

Conventional open cable broadcast systems have two types of channels. One is the in-band (INB) channel for receiving audio/video programs that a viewer can watch, and the other is the out-of-band (OOB) channel in which it is possible to communicate bi-directionally between a broadcasting station and a cable broadcast receiving apparatus, such as a digital set-top box or a DCR TV, and independently in a manner that is transparent to the user.

The OOB channel requires a POD module for processing. The POD module receives the OOB system information ("SI") data through the OOB channel, and transmits data tables included in the OOB SI data to the host after processing the tables to be compatible with the POD module.

In a conventional open cable broadcast receiving apparatus having such a POD module, the use of the OOB SI data is common for composing a channel map. The POD module processes channel map information through the OOB SI data. However, if incorrect channel information is offered in the POD module, the POD module may fail to detect the channel signal due to the incorrect channel information when tuning to a desired channel. Thus, a user's inability to watch a desired broadcast channel, is recognized as being a problem of the host.

SUMMARY OF THE INVENTION

Accordingly, it is an aspect of exemplary embodiments of the present invention to provide a cable broadcast receiving apparatus and a controlling method thereof capable of composing a correct channel map based on OOB data as well as INB data. Exemplary embodiments of the present invention can save time composing the channel map by reducing the channel search using the OOB data in a certain time.

The foregoing and other aspects of exemplary embodiments of the present invention can be achieved by providing a cable broadcast receiving apparatus comprising a cable broadcast receiver for receiving a cable broadcast signal, a POD cable card for processing out-of-band data received from the cable broadcast receiver, an INB processor for processing in-band data received from the cable broadcast receiver, and a controller for composing a channel map by comparing channel information included in the out-of-band data with channel information included in the in-band data.

According to an exemplary implementation, the cable broadcast receiver comprises a INB tuner for tuning the in-band data and an OOB tuner for tuning the Out Of Band data.

According to another exemplary implementation, the controller controls the INB tuner to search a channel automatically.

According to another exemplary implementation, the INB processor comprises an added data processor that parses the channel information included in the in-band data that is tuned by the INB tuner.

According to another exemplary implementation, the OOB tuner performs a one-time channel search.

According to another exemplary embodiment of the present invention, the apparatus further comprises a user selector for selecting a display function of a channel list, a video processor for processing a video signal included in the in-band data, and a display unit for displaying an image, wherein the controller controls the composed channel map to be displayed on the display unit when the display function of the channel list is selected.

The foregoing and other aspects of exemplary embodiments of the present invention can be achieved by providing a cable broadcast receiving apparatus comprising a cable broadcast receiver for receiving a cable broadcast signal, a POD cable card for composing a first channel map by processing out-of-band data received from the cable broadcast receiver, an added data processor for composing a second channel map by processing in-band data received from the cable broadcast receiver, and a controller for composing a final channel map by comparing the first channel map with the second channel map.

According to an exemplary implementation, the cable broadcast receiver comprises an INB tuner for tuning the in-band data and an OOB tuner for tuning the out-of-band data, and the OOB tuner executes a one-time channel search.

According to another exemplary embodiment of the present invention, the INB tuner performs automatic channel search, and the controller composes the final channel map based on the channel information of the second channel map in case that the channel information of two channel maps are different from each other by comparing the first channel map with the second channel map.

According to another exemplary embodiment of the present invention, the apparatus further comprises a user selector for selecting a display function of a channel list, a video processor for processing a video signal included in the in-band data, and a display unit for displaying an image, wherein the controller controls the composed channel map to be displayed on the display unit when the display function of the channel list is selected.

The foregoing and other exemplary embodiments of the present invention can be achieved by providing a method for composing a channel map of a cable broadcast receiving apparatus. The method comprises composing a first channel map after receiving and processing out-of-band data, composing a second channel map after receiving and processing in-band data, and composing a final channel map by comparing the first channel map with the second channel map.

According to an exemplary implementation, the composing of the first channel map comprises performing a one-time channel search.

According to another exemplary implementation, the composing of the second channel map comprises performing automatic channel search.

According to another exemplary implementation, the composing of the final channel map is composed based on channel information of the second channel map in the case of existence of the channel having different channel information.

According to an exemplary embodiment of the present invention, the method further comprises a user selector for selecting a display function of a channel list, a video processor for processing a video signal included in the in-band data, and a display unit for displaying an image, wherein the method comprising displaying the composed final channel map on the display unit when the display function of the channel list is selected.

BRIEF DESCRIPTION OF THE DRAWINGS

The above and other aspects, exemplary features and advantages of the present invention will become more apparent from the following detailed description of certain exemplary embodiments when taken in conjunction with the accompany drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
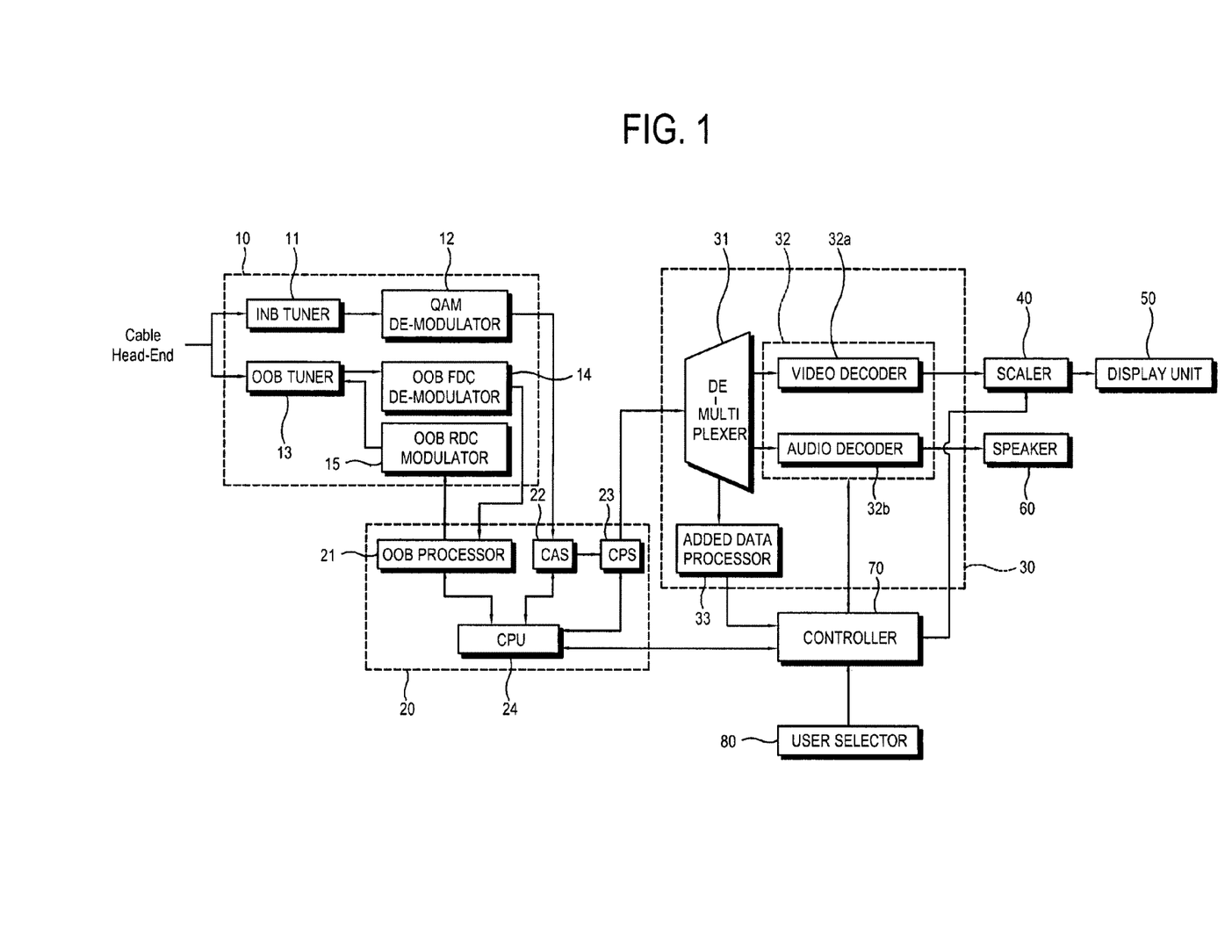
FIG. 1 is a control block diagram of a DCR TV according to an exemplary embodiment of the present invention.

As shown in FIG. 1, a DCR TV according to an exemplary embodiment of the present invention comprises a cable broadcast receiver 10 for receiving a cable broadcast signal, a POD cable card 20 for processing OOB data and INB data to perform conditional access (CA) and copy perfection (CP), an INB processor 30 for processing the INB data, a scaler 40, a display unit 50, a speaker 60, and a controller 70, and a user selector 80.

The cable broadcast receiver 10 according to an exemplary embodiment of this invention comprises an INB tuner 11, a Quadrature Amplitude Modulation (QAM) demodulator 12, an OOB tuner 13, an OOB Forward Data Channel (FDC) demodulator 14, and an OOB Reverse Data Channel (RDC) modulator 15.

The INB tuner 11 tunes the signal of the In-Band frequency band, that is, the frequency signal of the Forward Application Transport (FAT) channel in the RF signals transmitted from a cable head-end through the cable broadcasting network, to receive it. Also, the INB tuner 11 receives the signal of the frequency band, for example 57 MHz to 803 MHz, corresponding to the signal of multimedia service provided from the head-end for output.

The QAM demodulator 12 processes the signal from the INB tuner 11, and outputs the signal after demodulating the signal by using 64-QAM or 256-QAM.

The OOB tuner 13 tunes the signal of 70 MHz to 130 MHz transmitted through an OOB FDC to receive the signal with the OOB data. The OOB data of this exemplary embodiment which is a control and access message transmitted from a Multiple System Operation (MSO) to a DCR TV, comprises Conditional Access (CA) information for controlling the authority over the use of cable TV service, System Information (SI), Electronic Program Guide (EPG) information, and Emergency Alert System (EAS) information. The OOB SI Data comprises System Time Table (SST), Master Guide Table (MGT), Virtual Channel Table (VCT), Rating Region Table (RRT), Event Information Table (EIT), and Extended Text Table (ETT).

The OOB FDC demodulator 14 receives a signal from the OOB tuner 13 and outputs the OOB data after demodulating the received signal. The OOB FDC demodulator 14 performs Quadrature Phase-Shift Keying (QPSK) in demodulation of the OOB data.

The OOB RDC modulator 15 modulates the data transmitted from the OOB processor 21 (described below) when upstream transmission through a Reverse Data Channel (RDC) occurs from the DCR TV via the head-end to the MSO. The modulated upstream data is transmitted through a return channel transmitter of the OOB tuner 13.

According to an exemplary embodiment of the present invention, the POD cable card 20 comprises an OOB processor 21 for processing the OOB data, a Conditional Access System (CAS) 22 and a Copy Protection System (CPS) 23 related to, respectively, limitation of receiving and with prevention of duplication, and a CPU 24 for handling overall control and management of constitutional elements thereof.

The OOB processor 21 receives the OOB data from the OOB FDC demodulator 14 and manipulates it after decoding the OOB message according to a certain protocol. The CAS 22 receives multimedia data from the QAM demodulator 12 to perform a grant of the authority for the use of multimedia data according to control of the CPU 24 based on the OOB data. The CPS 23 performs processing for prevention of duplication of multimedia data.

The CPU 24 manages overall control of the POD cable card 20. The CPU 24 composes a channel map by using the OOB SI that the OOB processor 21 has parsed. The CPU 24 uses Network Information Table ("NIT") and Virtual Channel Table ("VCT") information in the OOB SI data. Also, the CPU 24 can communicate with the host side controller described below, namely, the DCR TV controller.

According to an exemplary embodiment of the present invention, the INB processor 30, that is, a module for processing the in-band data, comprises a de-multiplexer 31 for dividing the in-band data from the POD cable card 20 into a video signal, an audio signal, and added data; and a decoder 32 for decoding video and audio signals being separated from the de-multiplexer 31.

The decoder 32 comprises a video decoder 32a configured to follow a video standard such as the MPEG-2 standard, and an audio decoder 32b configured to follow an audio standard such as the AC-3 standard. In the case of a non-encoded program, the program is bypassed in the POD cable card 20 and processed in the INB processor 30.

The INB processor 30 further comprises an added data processor 33 that processes the separated added data. The INB processor 30 parses Program and System Information Protocol (PSIP) information, and then processes the added data concerning the program included in the PSIP data, while the transmission stream of the in-band channel comprises system and service information.

The INB processor 30 can compose the channel map through VCT, NIT information that are included in PSIP data of every channel. In order to know the channel information of every channel, all channels should be searched, for which the INB tuner 11 can be set up for performing its automatic search.

The scaler 40 converts the video signal to be consistent with the screen aspect ratio, resolution, and vertical frequency compatible with the output standard of the display unit. For example, the display unit 50 is applicable to various types of display modules such as Digital Light Projector (DLP), Liquid Crystal Display (LCD), and Plasma Display Panel (PDP), and the like.

The controller 70 may be implemented by the CPU, which controls the DCR TV. The controller 70 compares the channel map information that processed in the INB processor 30, being received as the INB PSIP data with the channel map information that is processed in the POD cable card 20, received as the OOB SI data, thereby composing the final channel map.

The controller 70 makes the OOB tuner 13 perform an OOB channel search and controls the INB tuner 11 to perform an automatic channel search. The final channel map is accomplished by comparing the channel map composed in the POD cable card 20 by channel search with the channel map composed in the added data processor 33. Therefore, the composing time of the channel map can be reduced by diminishing the channel search using the OOB data. For example, the composing time can be reduced by a factor of seven. The constitution of the final channel map by the controller 70 will be described in detail below.

According to an exemplary embodiment of the present invention, the DCR TV further comprises a user selector 80. The user selector 80 facilitates selecting a display function of a channel list and comprises a menu key mounted on a wireless remote controller and a key signal generator that generates a key signal corresponding to key manipulation. The user selector 80 may be provided with a mouse, a keyboard, or on the main body panel of a digital TV.

If the display function of the channel list is chosen through the user selector 80, the controller 70 generates OSD data according to the completed channel map information to output it to the scaler 40. The scaler 40 then mixes the generated OSD data with the image signal currently being processed, and outputs the signal to the display unit 50.

Figure 2:
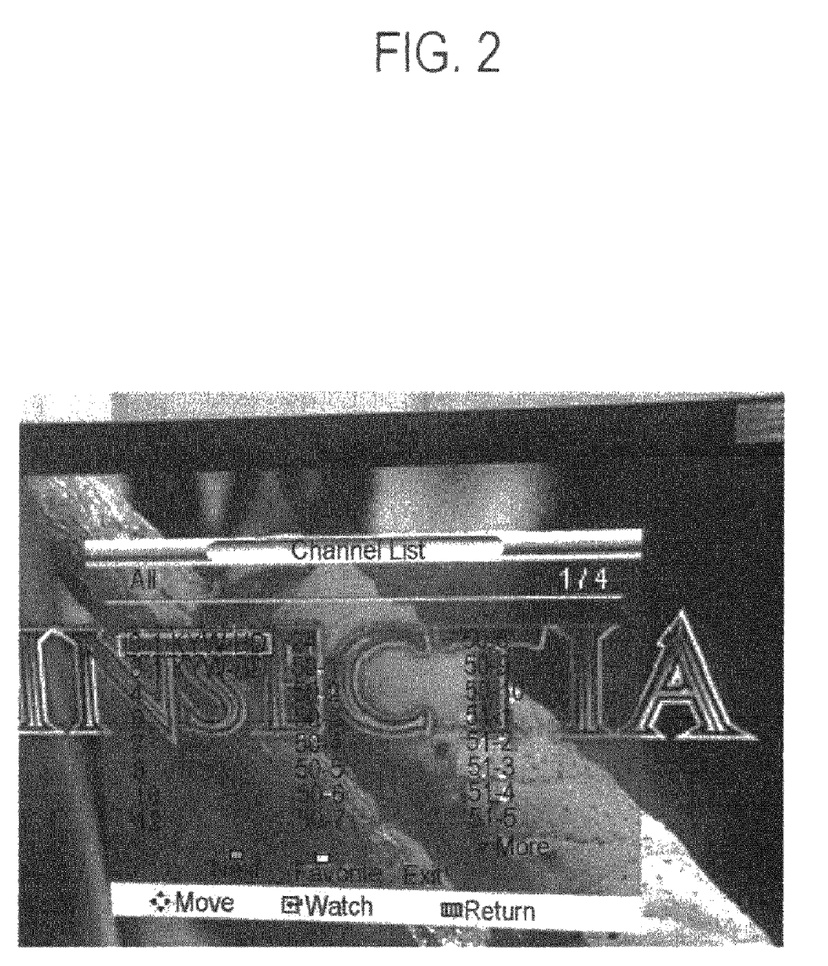
FIG. 2 shows channel map information displayed on a screen of the DCR TV according to an exemplary embodiment of the present invention.

An example of a screen display according to composition of the channel list is shown in FIG. 2. As shown in FIG. 2, a channel list of currently existing channels is displayed on the screen, and the user can confirm which channel presently exists.

Figure 3:
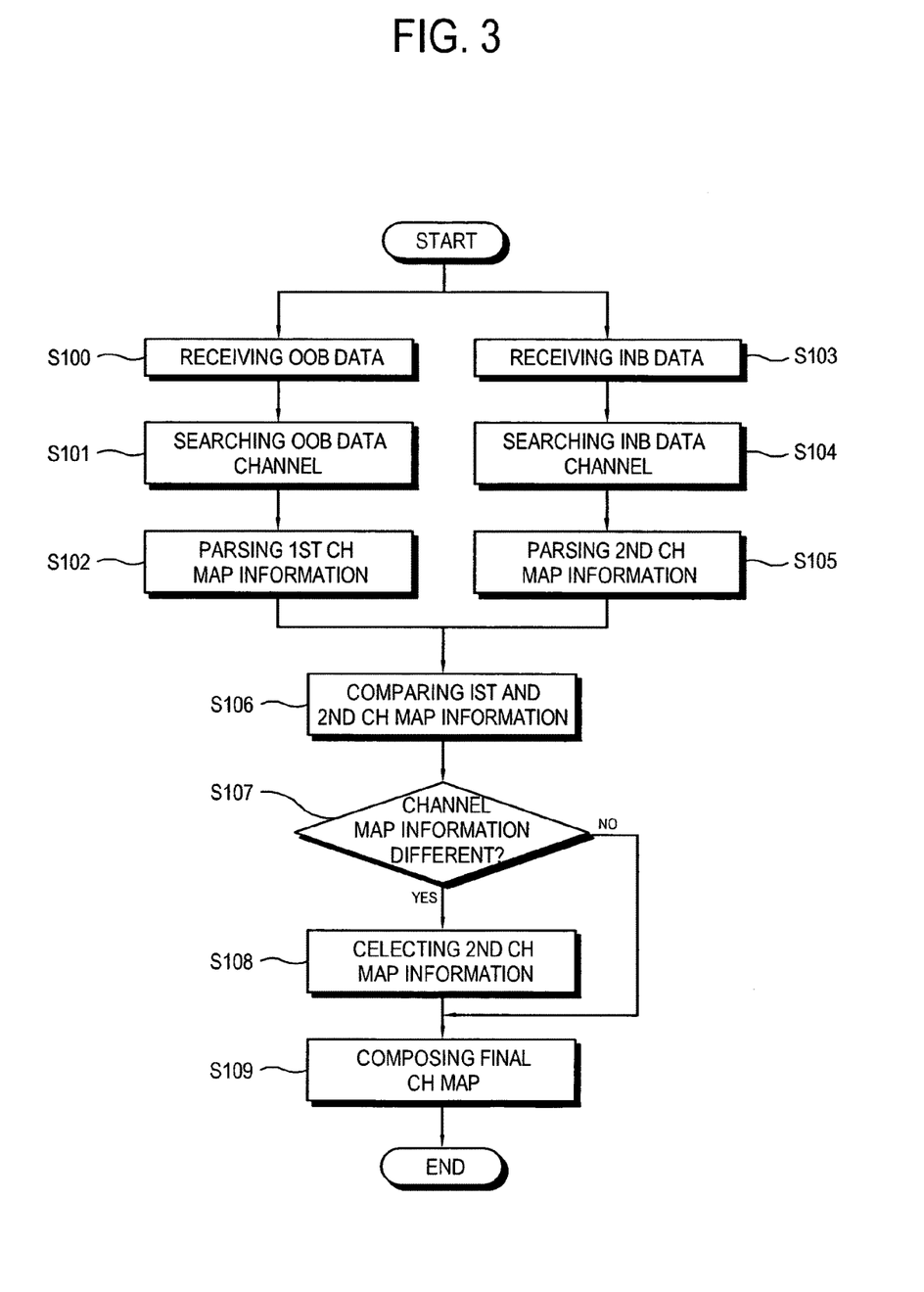
FIG. 3 is a control flow chart of the DCR TV according to an exemplary embodiment of the present invention.

Turning now to FIG. 3, the method for composing the channel map according to the exemplary embodiment of this invention will be explained.

The OOB tuner 13 receives the OOB data (S100), and searches the OOB data channel (S101). The channel search is executed at least one time. The OOB processor 21 composes the first channel map information after parsing the channel information searched (S102).

The INB tuner 11 receives INB data (S103), and automatically searches INB data channel (S104). The added data processor 33 composes the second channel map information after parsing the PSIP data (S105).

The composition of the first channel map using the OOB data and the composition of the second channel map using INB data can be executed concurrently, although the sequence may be set up differently.

The controller 70 compares the first channel map information according to the OOB data with the second channel map information according to the INB data (S106). The controller 70 also determines whether one channel with different channel information exists in which the first channel map information and the second channel map information are different from each other (S107). If a channel with different channel information exists, the controller 70 selects the channel information according to the second channel map information based on INB data regarding the channel having different channel information (S108). Namely, in the case that an unlocking channel exists according to the first channel map information, the corresponding channel is locked according to the second channel map information.

Subsequently, the controller 70 completes the final channel map according to the selected channel information (S109). Therefore, the possibility of error in composing the channel map using OOB data can be reduced.

Figure 4:
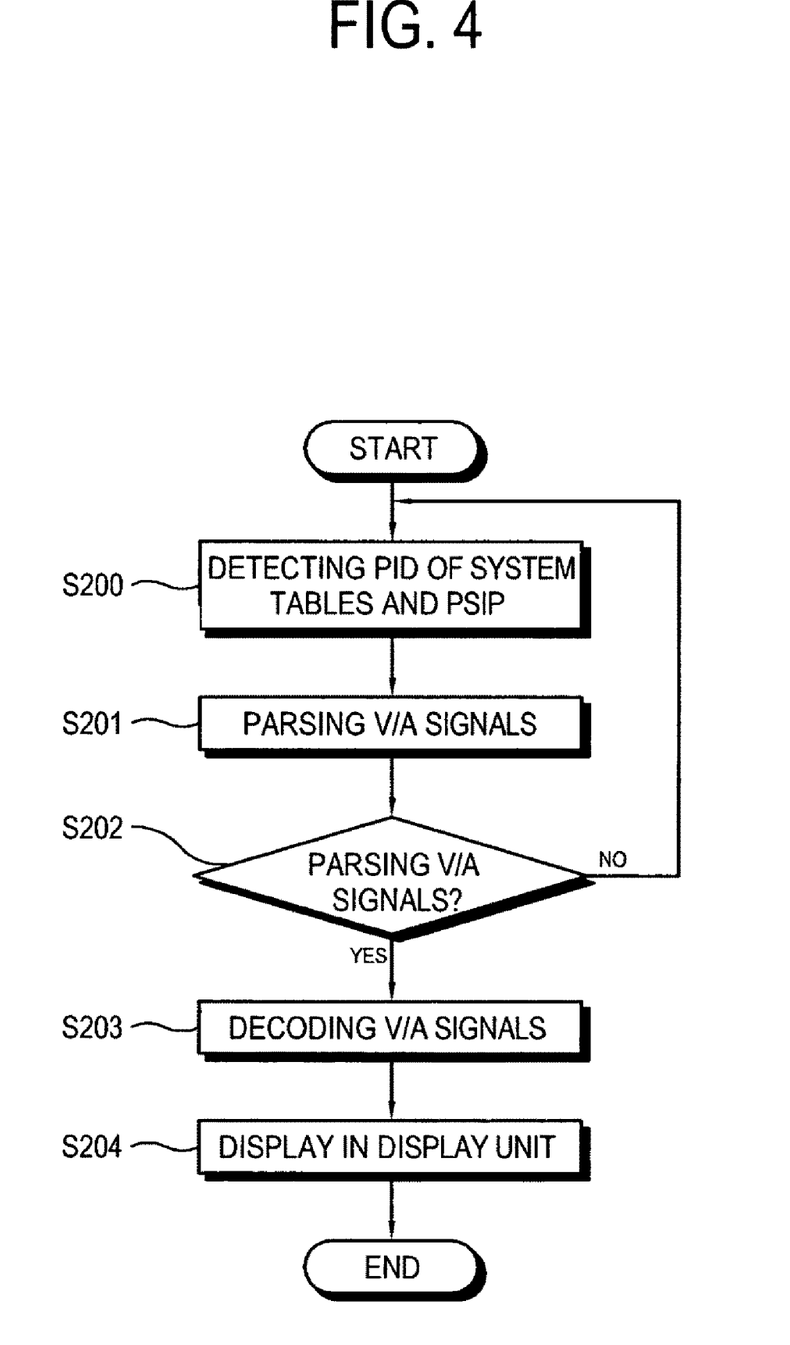
FIG. 4 is a flow chart displaying a cable broadcast according to channel map composition according to an exemplary embodiment of the present invention.

The display method of cable broadcast according to the foregoing exemplary embodiment will be explained with reference to FIG. 4. When the user selects a specific channel, the controller 70 controls the INB tuner 11 to tune to the corresponding channel according to completed channel map information. The controller 70 then detects PSIP data and Packet ID (PID) of the system tables received from the tuned channel (S200).

Moreover, the controller 70 parses video/audio signals by using the detected PID (S201), and determines whether the video/audio signals are parsing or not (S202), and decodes the parsed video/audio signals (S203). When the video/audio signals are not parsed in the corresponding channel according to corresponding information, the controller returns to detect PSIP and PID again (S200).

Thus, such decoded video is processed by the scaler 40 and it is displayed in the display unit (S204). Having composed a channel map by referring to the channel information involved in the OOB and INB channels, the possibility of error in channel tuning can be reduced.

Though only DCR TV is exemplified in the foregoing exemplary embodiment, a skilled artisan would readily recognize that the present invention can be applicable to any cable broadcast receiving device such as a set-top box or the like.

As described above, exemplary embodiments of the present invention provide a cable broadcast receiving apparatus and controlling method thereof capable of composing a correct channel map based on the OOB data as well as the INB data. Additionally, time can be saved in composing the channel map by reducing the channel search using OOB data within a certain time.

While the present invention has been particularly shown and described with reference to certain exemplary embodiments thereof, it will be understood by those of ordinary skill in the art that various changes in form and detail may be made therein without departing from the spirit and scope of the invention as defined by the appended claims and equivalents thereof.

What is claimed is:

1. A cable broadcast receiving apparatus, comprising:
a cable broadcast receiver for receiving a cable broadcast signal;
a point-of-deployment (POD) cable card for processing out-of-band data received from the cable broadcast receiver;
an in-band (INB) processor for processing in-band data received from the cable broadcast receiver; and
a controller for composing a final channel map by comparing, for at least one channel number, corresponding information mapped in a first channel map composed by processing the out-of-band data with corresponding information mapped in a second channel map composed by processing the in-band data;
wherein the first channel map is composed by using at least virtual channel table information and network information table information included in system information data contained in the out-of-band data, and the second channel map is composed by using at least virtual channel table information and network information table information included in data of a program and system information protocol contained in the in-band data;
wherein the controller determines whether there exists one channel number such that, for the one channel number, the corresponding information mapped in the first channel map differs from the corresponding information mapped in the second channel map;
wherein, if the controller determines that the one channel number exists, the controller selects the corresponding information mapped to the one channel number in the second channel map as the corresponding information mapped to the one channel number in the final channel map; and
wherein the first channel map, the second channel map and the final channel map each comprise a collection of mapping entries each of which maps information for detecting a channel signal of a particular channel number to the particular channel number.

2. The apparatus according to claim 1, wherein the cable broadcast receiver comprises an INB tuner for tuning the in-band data and an out-of-band (OOB) tuner for tuning the out-of-band data.

3. The apparatus according to claim 2, wherein the controller controls the INB tuner to search a channel automatically.

4. The apparatus according to claim 3, wherein the INB processor comprises an added data processor that parses the channel information in the in-band data tuned by the INB tuner.

5. The apparatus according to claim 4, wherein the OOB tuner performs a one-time channel search.

6. The apparatus according to claim 5, further comprising:
a selector for selecting a display function of a channel list;
a video processor for processing a video signal in the in-band data; and
a display unit for displaying an image,
wherein the controller controls the composed channel map to be displayed on the display unit when the display function of the channel list is selected.

7. A cable broadcast receiving apparatus comprising:
a cable broadcast receiver for receiving a cable broadcast signal;
a point-of-deployment (POD) cable card for composing a first channel map by processing out-of-band data received from the cable broadcast receiver;
an added data processor for composing a second channel map by processing in-band data received from the cable broadcast receiver; and
a controller for composing a third channel map by comparing, for at least one channel number, corresponding information mapped in the first channel map with corresponding information mapped in the second channel map;
wherein the first channel map is composed by using at least virtual channel table information and network information table information included in system information data contained in the out-of-band data, and the second channel map is composed by using at least virtual channel table information and network information table information included in data of a program and system information protocol contained in the in-band data;
wherein the controller determines whether there exists one channel number such that, for the one channel number, the corresponding information mapped in the first channel map differs from the corresponding information mapped in the second channel map;
wherein, if the controller determines that the one channel number exists, the controller selects the corresponding information mapped to the one channel number in the second channel map as the corresponding information mapped to the one channel number in the third channel map; and
wherein the first channel map, the second channel map and the third channel map each comprise a collection of mapping entries each of which maps information for detecting a channel signal of a particular channel number to the particular channel number.

8. The apparatus according to claim 7, wherein the cable broadcast receiver comprises an in-band (INB) tuner for tuning the in-band data and an out-of-band (OOB) tuner for tuning the out-of-band data.

9. The apparatus according to claim 8, wherein the INB tuner performs automatic channel search, and the controller composes the third channel map based on channel information of the second channel map when the channel information of the first and second channel maps are different from each other by comparing the first channel map with the second channel map.

10. The apparatus according to claim 8, wherein the OOB tuner executes a one-time channel search.

11. The apparatus according to claim 9, further comprising:
a selector for selecting a display function of a channel list;
a video processor for processing a video signal in the in-band data; and
a display unit for displaying an image,
wherein the controller controls the composed channel map to be displayed on the display unit when the display function of the channel list is selected.

12. A method for composing a channel map of a cable broadcast receiving apparatus, the method comprising:
composing a first channel map after receiving and processing out-of-band data;
composing a second channel map after receiving and processing in-band data; and
composing a third channel map by comparing, for at least one channel number, corresponding information mapped in the first channel map with corresponding information mapped in the second channel map;

wherein the first channel map is composed by using at least virtual channel table information and network information table information included in system information data contained in the out-of-band data, and the second channel map is composed by using at least virtual channel table information and network information table information included in data of a program and system information protocol contained in the in-band data;

wherein the composing is implemented by a controller;

wherein the controller determines whether there exists one channel number such that, for the one channel number, the corresponding information mapped in the first channel map differs from the corresponding information mapped in the second channel map;

wherein, if the controller determines that the one channel number exists, the controller selects the corresponding information mapped to the one channel number in the second channel map as the corresponding information mapped to the one channel number in the third channel map; and wherein the first channel map, the second channel map and the third channel map each comprise a collection of mapping entries each of which maps information for detecting a channel signal of a particular channel number to the particular channel number.

13. The method according to claim 12, wherein the composing of the first channel map comprises performing a one-time channel search.

14. The method according to claim 12, wherein the composing of the second channel map comprises performing an automatic channel search.

15. The method according to claim 14, wherein the composing of the third channel map is based on channel information of the second channel map when a first and second channels have different channel information.

16. The method according to claim 15, further comprising:
selecting a display function of a channel list;
processing a video signal in the in-band data; and
displaying an image,
wherein a composed final channel map is displayed when the display function of the channel list is selected.

* * * * *